United States Patent
Koo et al.

(10) Patent No.: US 7,825,773 B2
(45) Date of Patent: Nov. 2, 2010

(54) MOBILE RADIO FREQUENCY IDENTIFICATION (MRFID) READER

(75) Inventors: Si-gyoung Koo, Yongin-si (KR); Woo-shik Kang, Yongin-si (KR); Heung-bae Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 940 days.

(21) Appl. No.: 11/702,490

(22) Filed: Feb. 6, 2007

(65) Prior Publication Data

US 2008/0074282 A1    Mar. 27, 2008

(30) Foreign Application Priority Data

Sep. 21, 2006    (KR) .................... 10-2006-0091753

(51) Int. Cl.
- H04Q 5/22 (2006.01)
- G08B 13/14 (2006.01)
- H04B 1/00 (2006.01)
- H04B 17/02 (2006.01)
- H04B 7/00 (2006.01)

(52) U.S. Cl. .................. 340/10.4; 340/10.1; 340/10.3; 340/572.4; 455/60; 455/139; 455/276.1

(58) Field of Classification Search ............... 340/10.1, 340/10.3, 10.4, 572.4; 455/60, 78, 139, 180.3, 455/260, 276.1

See application file for complete search history.

(56) References Cited

U.S. PATENT DOCUMENTS

| | | | |
|---|---|---|---|
| 5,974,301 A * | 10/1999 | Palmer et al. | 455/63.1 |
| 6,107,910 A | 8/2000 | Nysen | |
| 7,023,817 B2 * | 4/2006 | Kuffner et al. | 370/324 |
| 7,155,172 B2 | 12/2006 | Scott | |
| 7,199,713 B2 | 4/2007 | Barink et al. | |
| 7,652,577 B1 * | 1/2010 | Madhow et al. | 340/572.1 |
| 2004/0069852 A1 | 4/2004 | Seppinen et al. | |
| 2006/0192655 A1 * | 8/2006 | Levin | 340/10.2 |

* cited by examiner

Primary Examiner—Daniel Wu
Assistant Examiner—Mark Rushing
(74) Attorney, Agent, or Firm—Sughrue Mion, PLLC

(57) ABSTRACT

A mobile radio frequency identification (mRFID) reader having a receiving circuit is provided. The receiving circuit includes a local oscillator which generates a carrier signal at a predetermined frequency band; a mixer which mixes a tag signal received from a tag with the carrier signal, to lower a frequency of the tag signal; a phase adjusting block which adjusts a phase of the carrier signal by determining a phase of the tag signal; and a control block which processes the tag signal through a series of operations, and controls an operation of the phase adjusting block to compensate for a phase delay of the tag signal according to an output of the processed tag signal. Because the mRFID reader can be provided as small as a half size of a related art reader, a mobile communication terminal accommodating the mRFID reader can be compact-sized. Additionally, because the number of components for the receiving circuit decreases, not only the power consumption but also the unit price can be reduced.

13 Claims, 7 Drawing Sheets

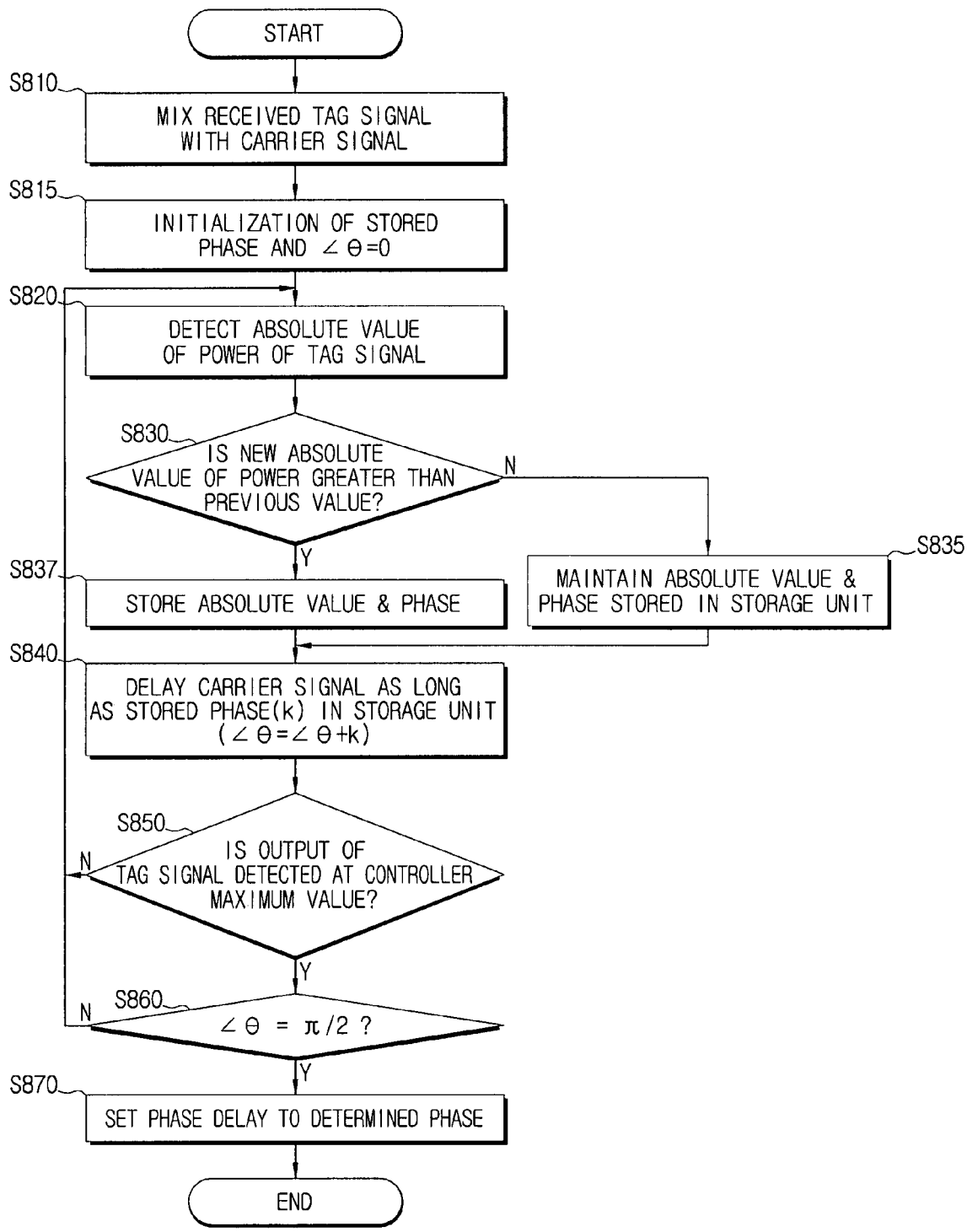

MOBILE RADIO FREQUENCY IDENTIFICATION (MRFID) READER

CROSS-REFERENCE TO RELATED APPLICATIONS

This application claims priority from Korean Patent Application No. 10-2006-0091753 filed on Sep. 21, 2006 in the Korean Intellectual Property Office, the entire disclosure of which is incorporated herein by reference.

BACKGROUND OF THE INVENTION

1. Field of the Invention

Apparatuses consistent with the present invention relate to a mobile radio frequency identification (mRFID) reading, and more particularly, to mRFID reading with reduced power consumption and cost by a compact-sized mRFID reading device.

2. Description of the Related Art

A Radio Frequency Identification (RFID) system generally includes a reader, an antenna, an electronic tag, a server, and a network. The reader reads recorded data from the electronic tag or records the data in the electronic tag. The antenna exchanges the recorded data of the electronic tag with the predefined frequency and protocol.

A mobile RFID (mRFID) technology has been achieved by combining a RFID system and mobile communications. In a mRFID system, an electronic tag, a reader, an antenna and a processing module are attached to a mobile communication terminal, so that the mobile communication terminal can read information from external electronic tags and provide helpful information to users, or transfer information to other mobile communication devices through its electronic tag.

FIG. 1 is a schematic circuit diagram of a related art mRFID reader. The mRFID reader in FIG. 1 includes a transmitting circuit 1b and a receiving circuit 1a.

The transmitting circuit 1b generates a transmission signal of certain frequency that is transmitted to a tag. The transmitting circuit 1b modulates a transmission signal using a Single Side Band (SSB) or Double Side Band (DSB). At 1b, the SSB sends both of I-signal and Q-signal, while the DSB sends only one of the I-I-signal and the Q-signal. But, At 1a, receiving circuit needs both I signal and Q signal because receiver doesn't know a distance between tag and transmitter(reader).

The receiving circuit 1a processes I-signal and Q-signal, and includes an I-signal processing circuit 2a, a Q-signal processing circuit 2b, a local oscillator 7a, an IQ combiner 8, and a baseband signal processing block 9.

The I-signal processing circuit 2a and the Q-signal processing circuit 2b are configured in the same structure, including a Low Noise Amplifier (LNA) 3a, 3b, a mixer 4a, 4b, a filter 5a, 5b, an amplifier 6a, 6b, and an Analog-to-Digital Converter (ADC) (not shown).

The local oscillator 7a provides the mixers 4a, 4b of the I-signal processing circuit 2a and the Q-signal processing circuit 2b with a carrier signal, respectively. The I-signal and the Q-signal are at 90° phase difference, and the carrier signals being provided to the mixers 4a, 4b of the I-signal processing circuit 2a and the Q-signal processing circuit 2b are at 90° phase difference from each other, accordingly. To keep 90° phase difference between the carrier signals, a phase difference generating unit 7b is provided to the Q-signal processing circuit 2b to generate 90° phase difference to a carrier signal being transmitted from the local oscillator 7a.

The IQ combiner 8 receives the I-signal and the Q-signal which are processed at the I-signal processing circuit 2a and the Q-signal processing circuit 2b, and combines the received signals into a single signal.

The baseband signal processing block 9 receives the signal from the IQ combiner 8, and reads the received signal by performing processing such as decoding and thus acquires information of the tag.

As explained above, the related art mRFID reader includes the I-signal processing circuit 2a and the Q-signal processing unit 2b of the same structure, to process the I-signal and the Q-signal, respectively. Meanwhile, in order to compensate for the delay of receiving a reflected signal from the tag, that is, to compensate for a phase delay according to the distance between a tag and a mRFID reader, the related art mRFID reader processes the I-signal and the Q-signal separately, and then combines the processed signals.

The related art mRFID reader has a large size to accommodate the I-signal processing circuit 2a and the Q-signal processing circuit 2b. Additionally, the requirement to accommodate the associated components and the generally large components such as mixers 4a, 4b or filters 5a, 5b further increases the size of the mRFID reader. As the size of the mRFID reader increases, a mobile communication terminal has to be sized larger to accommodate the mRFID reader. This goes against the customer's demands for compact size products. Additionally, the related art mRFID reader has also the problems of high power consumption and unit price.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a mRFID reader which is compact sized, and has low power consumption and economic price.

According to an aspect of the present invention, there is provided a mRFID reader having a receiving circuit, the receiving circuit comprising: a local oscillator which generates a carrier signal at a predetermined frequency band; a mixer which mixes a tag signal received from a tag with the carrier signal, to lower a frequency of the tag signal; a phase adjusting block which adjusts a phase of the carrier signal by determining a phase of the tag signal; and a control block which processes the tag signal through a series of operations, and controls an operation of the phase adjusting block to compensate for a phase delay of the tag signal according to an output of the processed tag signal.

The phase adjusting block may comprise a phase delay unit which delays the carrier signal as long as a predetermined phase and provides the mixer with the delayed carrier signal.

The phase adjusting block may further comprise a power evaluation unit which determines a power of the tag signal and a phase at a time that the power is detected.

The power evaluation unit may detect an absolute value of the power.

The phase adjusting block may further comprise a storage unit which stores an information comprising the absolute value of the power detected by the power evaluation unit, and a phase corresponding to the absolute value of the power.

The power evaluation unit, on detecting a new absolute value of the power, may store the new absolute value of the power, only if the new absolute value of the power is greater than the absolute value of the power stored in the storage unit.

The phase adjusting block may further comprise a delay adjusting unit which controls such that a phase of the carrier signal is delayed at the phase delay unit as long as the phase stored in the storage unit.

The control block may comprise a controller which keeps the delay adjusting unit operating, until the output of the tag signal processed at the control block stops increasing.

The controller may keep the delay adjusting unit and the power evaluation unit operating, until the output of the tag signal reaches a maximum degree.

The controller may keep the delay adjusting unit and the power evaluation unit operating, while a preamble of the tag signal is received.

The controller may keep the delay adjusting unit and the power evaluation unit operating during a $\pi/2$ period of the tag signal.

The controller may keep the delay adjusting unit and the power evaluation unit operating during a $\pi$, or a $2\pi$ period of the tag signal.

BRIEF DESCRIPTION OF THE DRAWINGS

These and other aspects of the present invention will become more apparent and more readily appreciated from the following description of exemplary embodiments thereof, with reference to the accompanying drawings, in which:

FIG. 8 is a flowchart illustrating the process of compensating a phase delay of a mRFID reader according to an exemplary embodiment of the present invention.

DETAILED DESCRIPTION OF EXEMPLARY EMBODIMENTS OF THE INVENTION

Figure 1:
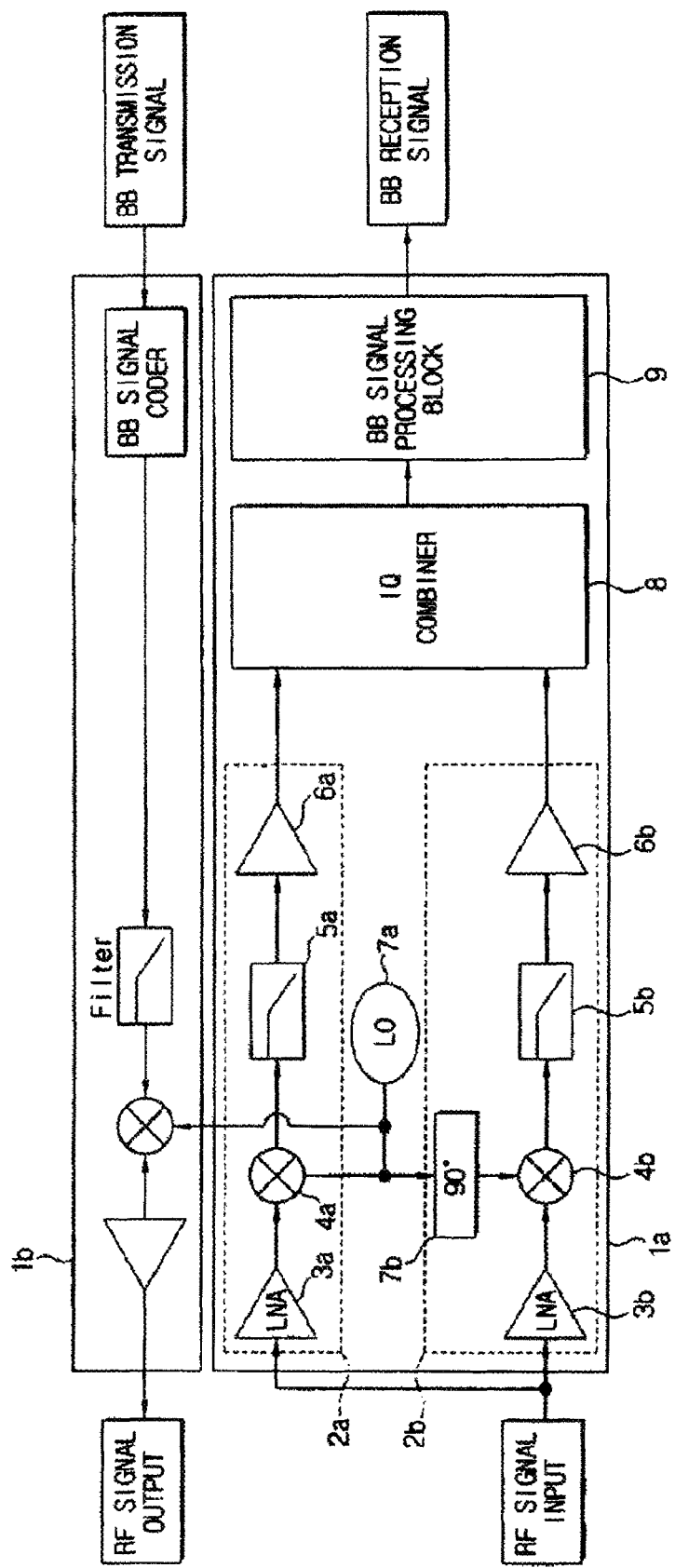
FIG. 1 is a schematic circuit diagram of a related art mRFID reader.

Certain exemplary embodiments of the present invention will now be described in greater detail with reference to the accompanying drawings.

In the following description, the same drawing reference numerals are used to refer to the same elements, even in different drawings. The matters defined in the following description, such as detailed construction and element descriptions, are provided as examples to assist in a comprehensive understanding of the invention. Also, well-known functions or constructions are not described in detail, since they would obscure the invention in unnecessary detail.

Figure 2:
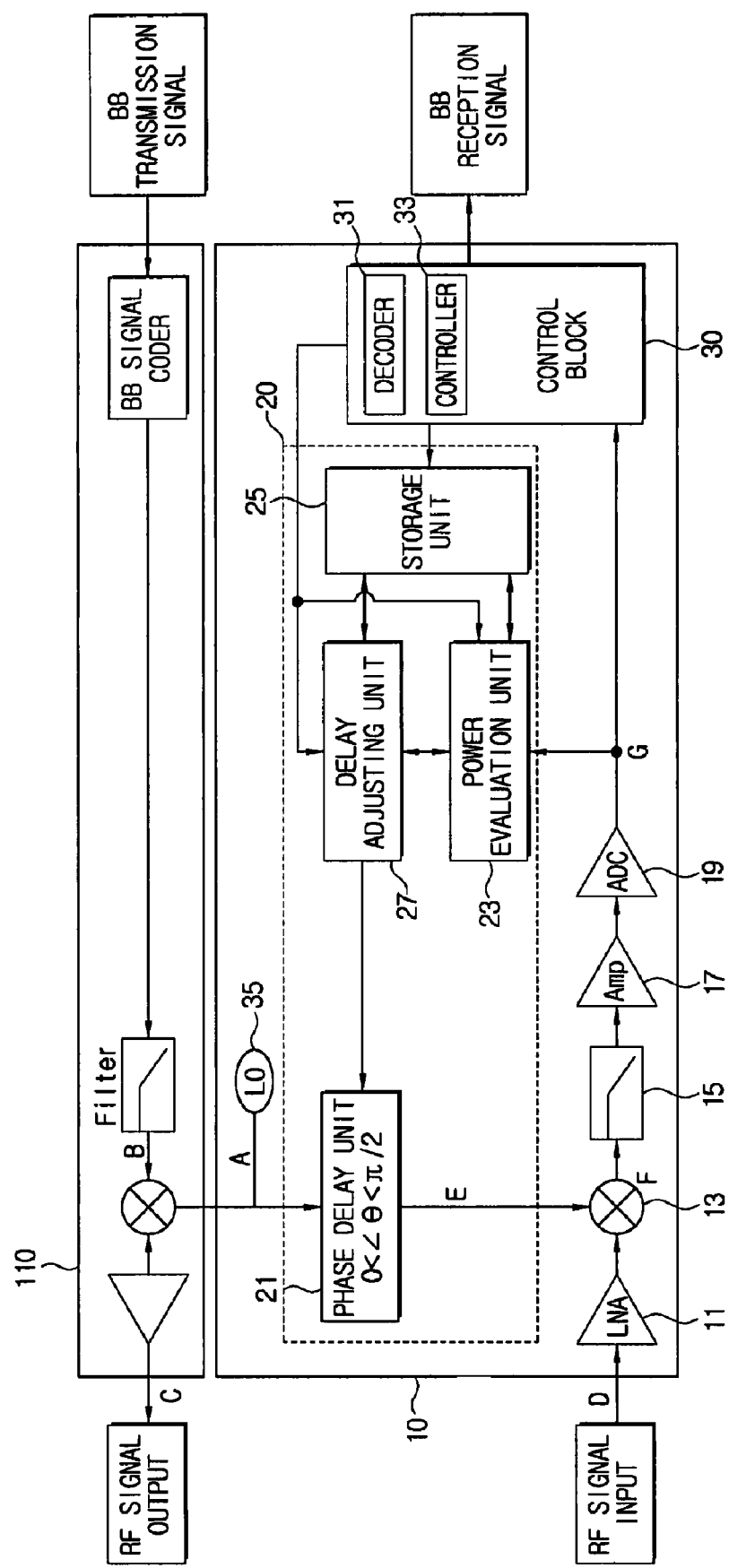
FIG. 2 is a circuit diagram of a mRFID reader according to an exemplary embodiment of the present invention.
Figure 3A:
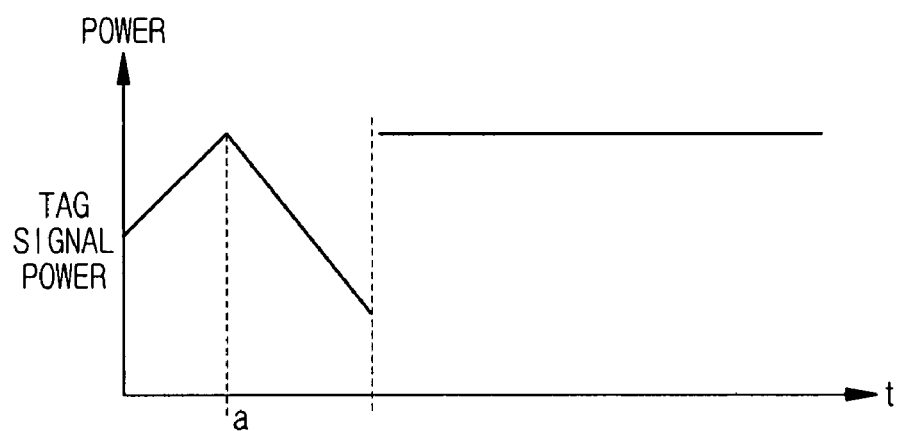
FIGS. 3A and 4A are graphical representations of power of a tag signal varying according to passage of time.
Figure 3B:
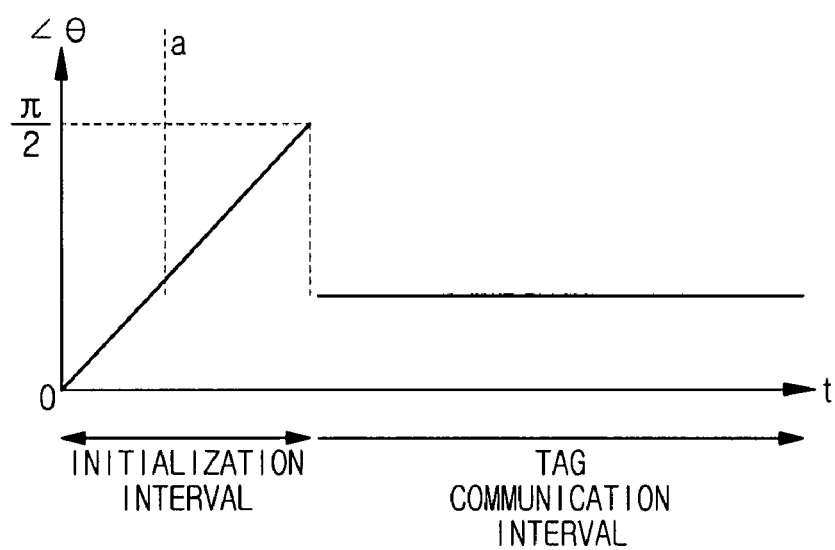
FIGS. 3B and 4B are graphical representations of phase varying according to the varying of the power in FIGS. 3A and 4A.
Figure 4A:
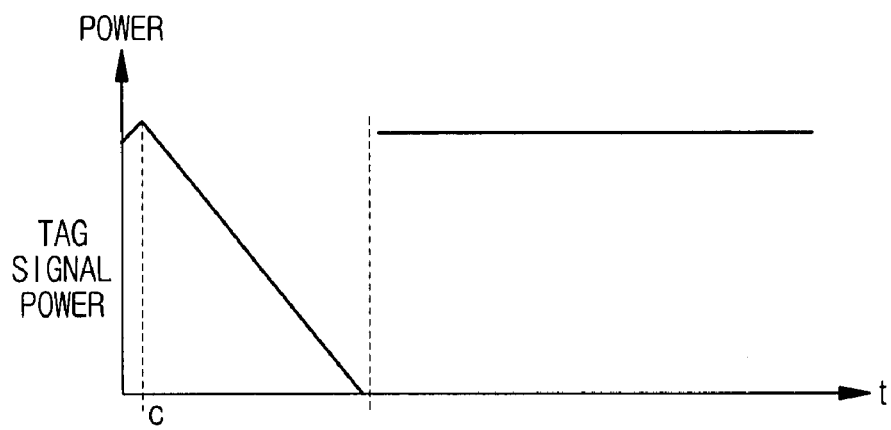
Figure 4B:
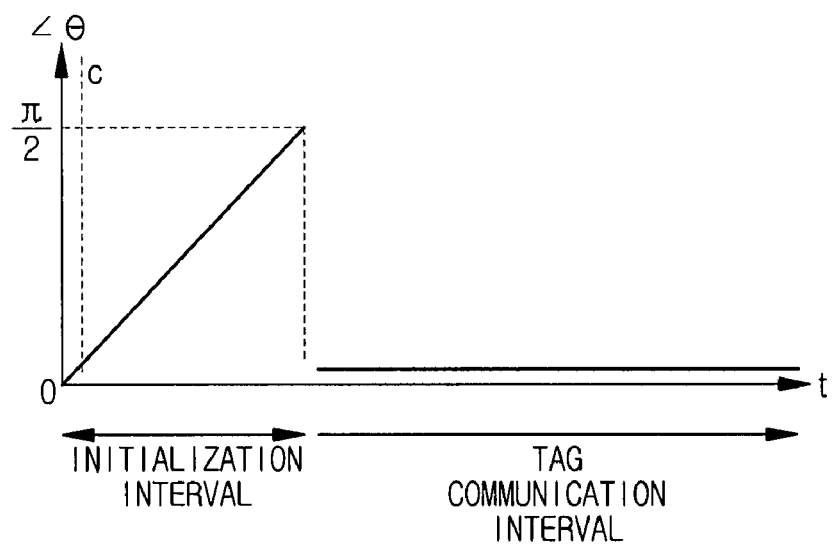

FIG. 2 is a circuit diagram of a mRFID reader according to an exemplary embodiment of the present invention.

The mRFID reader includes a receiving circuit 10 and a transmitting circuit 110. Unlike the related art system which has two processing circuits for I-signal and Q-signal, an exemplary embodiment of the present invention includes only one receiving circuit 10 which recovers a tag signal using a power and phase of the tag reflected signal.

The receiving circuit 10 of the mRFID reader may include a LNA 11, a local oscillator 35, a mixer 13, a filter 15, an amplifier 17, an ADC 19, a phase adjusting block 20, and a control block 30.

The LNA 11 operates to amplify a tag signal being transmitted from a tag, with a predetermined gain.

The local oscillator 35 generates a carrier signal of a predefined frequency band. The carrier signal generated at the local oscillator 35 is provided to a mixer of the transmitting circuit 110 and the mixer 13 of the receiving circuit 10 at the same time.

The mixer 13 receives the carrier signal which is generated at the local oscillator 35, and mixes the received carrier signal with the tag signal. As a result, the tag signal is down-converted to baseband. The receiving circuit 10 according to an exemplary embodiment of the present invention varies phase of the carrier signal with the phase adjusting block 20, and the power of the tag signal which is down-converted at the mixer 13 is varied according to the variation of the phase.

The filter 15 may be implemented as a Low Pass filter (LPF), and operates to filter a high frequency signal from the tag signal which is down-converted at the mixer 13.

The amplifier 17 amplifies the tag signal which is filtered at the filter 15 so as to output a suitable signal to be processed at the control block 30.

The ADC 19 converts the amplified tag signal into a digital signal.

The phase adjusting block 20 determines the degree of delay of the phase of the tag signal, using the power and phase of the tag signal, and compensates for the delayed phase so that the tag signal can be perceived accurately. The phase adjusting block 20 may include a phase delay unit 21, a power evaluation unit 23, a storage unit 25, and a delay adjusting unit 27.

The phase delay unit 21 may be located between the local oscillator 35 and the mixer 13, and operates to delay the carrier signal which is generated at the local oscillator 35 by a predetermined phase and provides the mixer 13 with the delayed carrier signal. The phase delay unit 21 adjusts the phase between 0 and $\pi/2$. The phase delay unit 21 may adjust the phase gradually by stages, or continuously. The phase delay unit 21 adjusts the delayed phase according to the control of the delay adjusting unit 27.

The power evaluation unit 23 detects the power of a digitalized tag signal and determines the phase of the detected power, and thus finds the phase having the maximum tag signal power. The power evaluation unit 23 detects the absolute value of power, and stores the detected absolute value of power and the phase detected at the time that the absolute value is detected, in the storage unit 25. The power evaluation unit 23 detects the absolute value of the tag signal power in $\pi/2$ period, because the maximum value is present in $\pi/2$ period according to the detection of the absolute value of power at the power evaluation unit 23.

Meanwhile, the power evaluation unit 23, on newly detecting an absolute value of power, compares the newly detected absolute value with the previously detected absolute value. The power evaluation unit 23 stores the newly detected absolute value and the information on the phase in the storage unit 25, if the newly detected absolute value is greater than the previously detected absolute value. However, the power evaluation unit 23 keeps the absolute value and the phase information in the storage unit 25, if the newly detected absolute value is not greater than the previously detected absolute value.

The storage unit 25 stores the absolute value of power which is detected by the power evaluation unit 23, and phase information corresponding to the absolute value. The information in the storage unit 25 is updated only if the absolute value of power newly detected by the power evaluation unit 23 is greater than the previously detected absolute value. As a result, the storage unit 25 always stores the maximum absolute value of power as detected by the power evaluation unit 23 up to a current time.

The delay adjusting unit 27 provides the phase delay unit 21 with the information pertaining to the phase stored in the storage unit 25, so that the phase of the carrier signal is delayed according to the phase stored in the storage unit 25. The delay adjusting unit 27 provides the phase delay unit 21 with the phase information every time the absolute value of power and the phase in the storage unit 25 change. According to the power evaluation unit 23 which detects the absolute value of power either continuously or gradually, the absolute value of power and the phase in the storage unit 25 vary either continuously or gradually. Accordingly, the delay adjusting unit 27 provides the phase delay unit 21 in real-time basis with the varying phase information, such that the phase of the carrier signal varies either continuously or gradually. The delay adjusting unit 27 sends the phase information to the phase delay unit 21 in a manner as explained above, and determines that the absolute value of power reaches the maximum degree, if the absolute value of power and the phase stored in the storage unit 25 are not changed, or are currently changing at the end of the $\pi/2$ period. The delay adjusting unit 27 then sets the phase delay unit 21 to delay carrier signal according to the corresponding phase.

The control block 30 may include a decoder 31, and a controller 33. The control block 30 controls the phase adjusting block 20 to adjust the phase of a carrier signal being generated at the local oscillator 35 according to a tag signal processed at the decoder 31, such that an output of the tag signal can be adjusted.

The decoder 31 selects a tag signal transmitted from an intended tag among the tag signals received. The decoder 31 then decodes the selected tag signal and provides the controller 33 with the decoded tag signal.

The controller 33 controls the operation of the delay adjusting unit 27 and the power evaluation unit 23 according to the tag signal processed at the decoder 31, such that the output of the tag signal reaches the maximum degree. The controller 33 keeps the delay adjusting unit 27 operating until the output of the tag signal provided by the decoder 31 does not increase any more, that is, until the output of the tag signal reaches the maximum degree. The controller 33 controls the phase adjusting block 20 in $\pi/2$ period of the tag signal while the preamble of the tag signal is received such that a maximum tag signal can be output. However, if a phase at which the output of the tag signal is maximum is not found in the duration that the preamble of the tag signal is received, finding a phase of maximum tag signal output may be extended to the communication period following the preamble.

The process of receiving a tag signal and compensating a phase delay using a mRFID reader constructed as explained above according to an exemplary embodiment of the present invention will be explained in detail below with reference to FIG. 8.

First, the transmitting circuit 110 of the mRFID reader sends out a request signal to a tag for a transmission of a tag signal. In order to send out the request signal, the transmitting circuit 110 of the mRFID reader generates the request signal by generating a transmission signal, and mixing the generated transmission signal B with a carrier signal A of the local oscillator 35. The carrier signal A being transmitted from the local oscillator 35 and the transmission signal B generated at the transmitting circuit 110 may be expressed by the following mathematical expressions 1 and 2, respectively.

$$A = \cos(2\pi f_c)t \quad \text{Mathematical expression 1}$$

$$B = A_s \cos 1(2\pi f_s)t \quad \text{Mathematical expression 2}$$

$f_c$ is the frequency of the carrier signal A which is formed in local oscillator 35, and $f_s$ is the frequency of the transmission signal B. The carrier signal A is formed in a predetermined frequency band for the transmission of the transmission signal B. Additionally, $A_s$ is the amplitude of the transmission signal B.

The mixer of the transmitting circuit 110 performs up-conversion by mixing the carrier signal A of the local oscillator 35 with the transmission signal B. As a result, a request signal C which may be expressed as the following is generated.

$$C = \cos(2\pi f_c)t * A_s \cos(2\pi f_s)t \quad \text{Mathematical Expression 3}$$
$$= \frac{1}{2}A_s \begin{bmatrix} \cos(2\pi f_c + 2\pi f_s)t + \\ \cos(2\pi f_c - 2\pi f_s)t \end{bmatrix}$$

Figure 5:
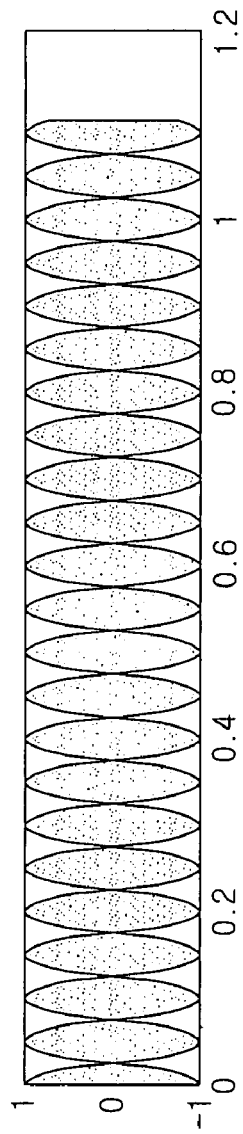
FIG. 5 is a graphical representation of a tag signal received at a receiving circuit.

The request signal C is transmitted to the tag, and the tag sends out a tag signal D, expressed by mathematical expression 4 below, in response to the request signal C. The tag signal D is in a sinusoidal waveform with constant amplitude, as illustrated in FIG. 5.

$$D = \frac{1}{x}A_g\cos(2\pi f_g)t * \cos[(2\pi f_c)t + \Delta\theta] \quad \text{Mathematical Expression 4}$$

where $1/x$ is the power loss generated while the tag signal D is transmitted, which has different value depending on the distance and channel characteristics. $A_g$ is the amplitude of the tag signal D, $f_g$ is the frequency band of the tag signal D, and $\Delta\theta$ is the distance difference between the tag and the reader, and the phase difference occurring due to the delays of switching in the duration between when the request signal C reaches the tag and when the tag is turned on. Therefore, $\Delta\theta$ may vary if the distance between the tag and the reader changes, or according to different switching times of tags.

At step 810, the tag signal D is mixed with a carrier signal E of the local oscillator 35 and down-converted. The phase of the carrier signal E of the local oscillator 35 is delayed according to the phase delay unit 21 and provided to the mixer 13. The carrier signal E provided to the mixer 13 may be expressed as follows:

$$E = \cos[(2\pi f_c)t + \angle\theta] \quad \text{Mathematical expression 5}$$

where $\angle\theta$ is the phase of the carrier signal E of the local oscillator 35 which is delayed at the phase delay unit 21.

Figure 6:
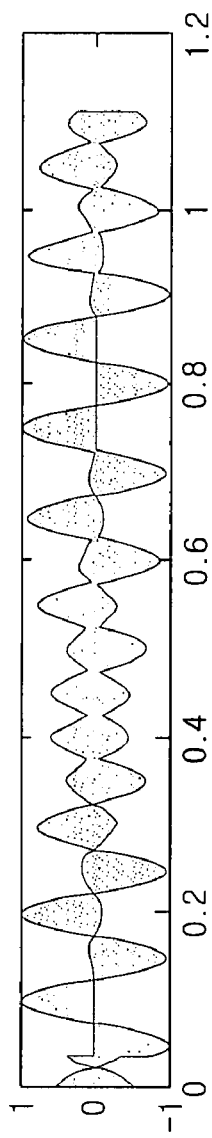
FIG. 6 is a graphical representation of a tag signal being mixed with a carrier signal at a mixer.

The tag signal D is amplified at the LNA 11, during which $1/x$ of expression 4 is removed. Accordingly, as the mixer 13 mixes the tag signal D with the carrier signal E, a tag signal F, which may be expressed by mathematical expression 6 below, is generated. The tag signal F has the waveform as illustrated in FIG. 6, which indicates that the output size of the tag signal F varies over time, according to the phase variation.

$$F = A_g \cos(2\pi f_g)t *$$
$$\cos[(2\pi f_c)t + \Delta\theta] * \cos[(2\pi f_c)t + \angle\theta] =$$
$$\frac{1}{2} A_g \cos(2\pi f_g t)[\cos(2 * 2\pi f_c t + \Delta\theta + \angle\theta) +$$
$$\cos(\Delta\theta - \angle\theta)]$$

Mathematical Expression 6

The tag signal F is input to the filter 15, and thus the high frequency band signal is filtered at the filter 15. Accordingly, the high frequency band component $\cos(2*2\pi f_c t+\Delta\theta+\angle\theta)$ of expression 6 is removed, and the tag signal F is processed through the amplifier 17 and the ADC 19 such that a tag signal G, which may be expressed by mathematical expression 7 below, is provided to the power evaluation unit 23 and the control block 30.

$$G = \frac{1}{2} A_g \cos(2\pi f_g t)\cos(\Delta\theta - \angle\theta)$$

Mathematical Expression 7

Figure 7:
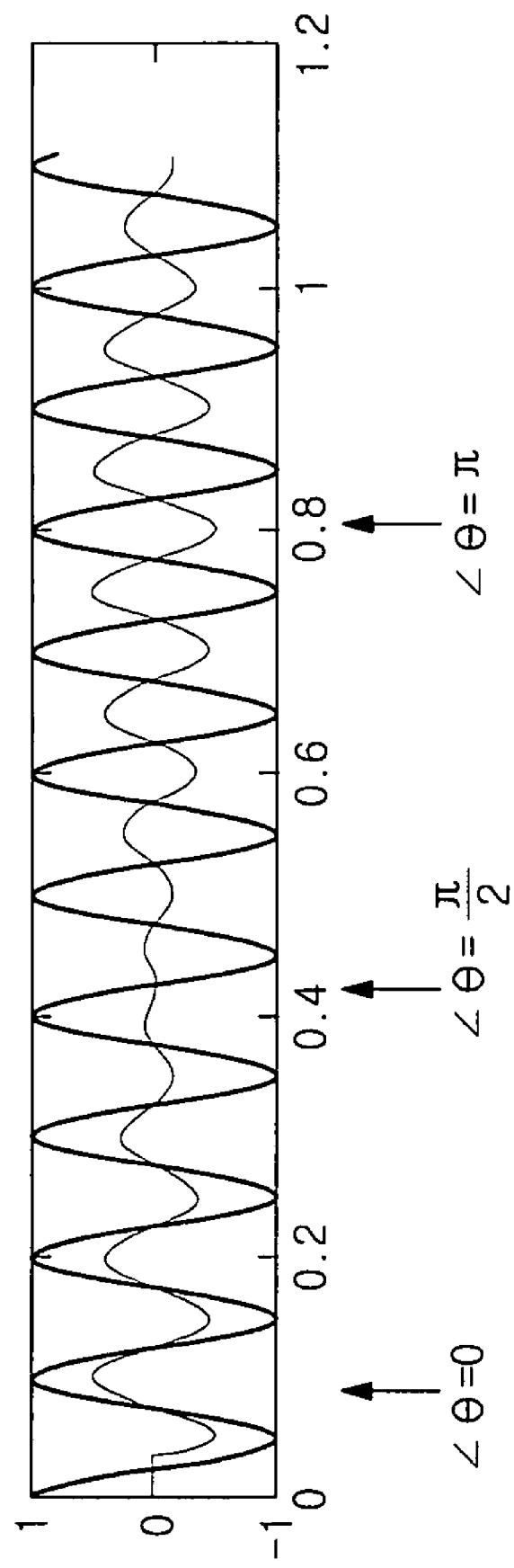
FIG. 7 is a graphical representation of a tag signal being past through a filter.

FIG. 7 shows a wave of the tag signal G in thin line, at which the power of the tag signal G changes according to the phase variation. The tag signal G of FIG. 7 particularly has the maximum value when $\angle\theta=0$, or $\pi$, which indicates that the tag is distanced away from the mRFID reader by 0, $\pi$, or multiples of $\pi$.

In order to have maximum tag signal G, as cos 0=1, it is necessary that $\Delta\theta=\angle\theta$. Accordingly, the mRFID reader compensates for the phase delay associated with the distance between the tag and the reader and switching delay of the tag, by finding a phase at which the tag signal G reaches the maximum.

The storage unit 25 initializes the stored phase, and the delay adjusting unit 27 initializes the phase of the phase delay unit 21 ($\angle\theta=0$) at step 815

The power evaluation unit 23, on receiving the tag signal G, detects the absolute value of power of the tag signal G at step 820, and stores a phase of a time that the absolute value is detected, together with the absolute value, in the storage unit 25. The power evaluation unit 23 compares the absolute value of power previously stored in the storage unit 25 with the absolute value of power newly detected, at step 830, stores the newly detected absolute value and the phase in the storage unit 25 at step 837, if the newly detected absolute value is greater than the previously stored absolute value, or maintains the previously stored absolute value at step 835, if the previously stored absolute power is greater than the newly detected absolute value.

Referring to FIGS. 3A, 3B, 4A and 4B, the mRFID reader reads tags at different distances, at which the tag signal G at FIG. 2 is generated by multiplying the tag signal F by a phase difference of the carrier signal generated at the local oscillator 35 while delaying the phase difference as long as $0\sim\pi/2$. The 'initialisation interval' of FIGS. 3A and 4A indicates that the absolute value of power of the tag signal G as detected by the power evaluation unit 23 varies during the $0\sim\pi/2$ period of the tag signal G. Accordingly, a phase corresponding to the absolute value of power also varies, as illustrated in the 'initialisation interval' of FIGS. 3B and 4B. The power evaluation unit 23 continues updating the absolute value and the corresponding phase in the storage unit 25, until the absolute value of power reaches the maximum point a and c. After the maximum point a and c, the absolute value of power declines and accordingly, the power evaluation unit 23 discontinues updating the absolute value of power and the phase in the storage unit 25. The phase delay unit 21 delays the carrier signal E of the local oscillator 35 by an appropriate phase to obtain the maximum absolute value of power, as illustrated in the 'tag communication interval' of FIGS. 3B and 4B, and the absolute value of power of the tag signal G accordingly reaches the maximum degree, as illustrated in the 'tag communication interval' of FIGS. 3A and 4A.

The control block 30, on receiving the tag signal G, utilizes the decoder 31 to conduct decoding, by separating a desired tag signal. The controller 33 then controls the operation of the delay adjusting unit 27, while observing the output of the tag signal G. While the preamble of the tag signal G is received, the controller 33 observes the output of the tag signal G during $0\sim\pi/2$ period to find a location of maximum output of the tag signal G.

The delay adjusting unit 27, under the control of the controller 33, controls the phase delay unit 21 so that the carrier signal E is delayed as long as the stored phase (step constant phase: k) in the storage unit 25 and output, at step 840. Accordingly, the phase delay unit 21 outputs the carrier signal E, which is delayed as long as the stored phase in the storage unit 25, and the output carrier signal E is mixed with the tag signal F at the mixer 13. As a result, the tag signal G is output.

The power evaluation unit 23 re-evaluates the tag signal G. Because the phase delayed at the delay adjusting unit 27 is the value that corresponds to the maximum absolute value of power that is evaluated until a predetermined time, the tag signal G has the output which is increased from the previous tag signal G.

Meanwhile, the controller 33 of the control block 30 determines whether the output of the tag signal G is maximum at step 850, and if not, repeats steps 820 and 840. If the output of the tag signal G is maximum, the controller 33 determines whether $\angle\theta$ reaches $\pi/2$ at step 860, and if so, stops the operation of the power evaluation unit 23, and controls the delay adjusting unit 27 to reset the phase of the phase delay unit 21.

As explained above, the mRFID reader according to an exemplary embodiment of the present invention compensates for a phase delay of the tag signal, by adjusting the phase of a carrier signal to be mixed with the tag signal and finding the phase at which the absolute value of power of the tag signal is maximum. As a result, it is not necessary for the mRFID reader to have an I-signal processing circuit and a Q-signal processing circuit to compensate for the phase delay.

According to an exemplary embodiment of the present invention, the mRFID reader receiver part can be provided as small as a half size of a related art reader's receiving part, and therefore, a mobile communication terminal accommodating the mRFID reader can be compact-sized. Additionally, because the number of components for the receiving circuit decreases, not only the power consumption but also the unit price can be reduced.

Although a few exemplary embodiments of the present general inventive concept have been shown and described, it will be appreciated by those skilled in the art that changes may be made in these exemplary embodiments without departing from the principles and spirit of the general inventive concept, the scope of which is defined in the appended claims and their equivalents.

What is claimed is:

1. A mobile radio frequency identification (mRFID) reader having a receiving circuit, the receiving circuit comprising:
   a local oscillator which generates a carrier signal at a predetermined frequency band;

a mixer which mixes a tag signal received from a tag with the carrier signal, to lower a frequency of the tag signal;

a phase adjusting block which adjusts a phase of the carrier signal by determining a phase of the tag signal; and a control block which processes the tag signal through a series of operations, and controls an operation of the phase adjusting block to compensate for a phase delay of the tag signal according to an output of the processed tag signal, wherein the phase adjusting block detects a power of the tag signal and the phase of the tag signal corresponding to the detected power, finds a phase having a maximum tag signal power and delays the phase of the carrier signal by the phase having the maximum tag signal power.

2. The mRFID reader of claim 1, wherein the phase adjusting block comprises a phase delay unit which delays the carrier signal as long as the phase having the maximum tag signal power and provides the mixer with the delayed carrier signal.

3. The mRFID reader of claim 2, wherein the phase adjusting block further comprises a power evaluation unit which determines the power of the tag signal and the phase of the tag signal at a time that the power is detected.

4. The mRFID reader of claim 3, wherein the power evaluation unit detects an absolute value of the power.

5. The mRFID reader of claim 4, wherein the phase adjusting block further comprises a storage unit which stores an information comprising the absolute value of the power detected by the power evaluation unit, and the phase of the tag signal corresponding to the absolute value of the power.

6. A mobile radio frequency identification (mRFID) reader having a receiving circuit, the receiving circuit comprising:

a local oscillator which generates a carrier signal at a predetermined frequency band;

a mixer which mixes a tag signal received from a tag with the carrier signal, to lower a frequency of the tag signal;

a phase adjusting block which adjusts a phase of the carrier signal by determining a phase of the tag signal; and a control block which processes the tag signal through a series of operations, and controls an operation of the phase adjusting block to compensate for a phase delay of the tag signal according to an output of the processed tag signal, wherein the phase adjusting block comprises a phase delay unit which delays the carrier signal as long as a predetermined phase and provides the mixer with the delayed carrier signal, wherein the phase adjusting block further comprises a power evaluation unit which determines a power of the tag signal and the phase of the tag signal at a time that the power is detected, wherein the power evaluation unit detects an absolute value of the power, wherein the phase adjusting block further comprises a storage unit which stores an information comprising the absolute value of the power detected by the power evaluation unit, and the phase of the tag signal corresponding to the absolute value of the power, and wherein the power evaluation unit, on detecting a new absolute value of the power, stores the new absolute value of the power, only if the new absolute value of the power is greater than the absolute value of the power stored in the storage unit.

7. A mobile radio frequency identification (mRFID) reader having a receiving circuit, the receiving circuit comprising:

a local oscillator which generates a carrier signal at a predetermined frequency band;

a mixer which mixes a tag signal received from a tag with the carrier signal, to lower a frequency of the tag signal;

a phase adjusting block which adjusts a phase of the carrier signal by determining a phase of the tag signal; and a control block which processes the tag signal through a series of operations, and controls an operation of the phase adjusting block to compensate for a phase delay of the tag signal according to an output of the processed tag signal, wherein the phase adjusting block comprises a phase delay unit which delays the carrier signal as long as a predetermined phase and provides the mixer with the delayed carrier signal, wherein the phase adjusting block further comprises a power evaluation unit which determines a power of the tag signal and the phase of the tag signal at a time that the power is detected, wherein the power evaluation unit detects an absolute value of the power, wherein the phase adjusting block further comprises a storage unit which stores an information comprising the absolute value of the power detected by the power evaluation unit, and the phase of the tag signal corresponding to the absolute value of the power, and wherein the phase adjusting block further comprises a delay adjusting unit which controls such that the phase of the carrier signal is delayed at the phase delay unit as long as the phase stored in the storage unit.

8. The mRFID reader of claim 7, wherein the control block comprises a controller which keeps the delay adjusting unit operating, until the output of the tag signal processed at the control block stops increasing.

9. The mRFID reader of claim 8, wherein the controller keeps the delay adjusting unit and the power evaluation unit operating, until the output of the tag signal reaches a maximum degree.

10. The mRFID reader of claim 8, wherein the controller keeps the delay adjusting unit and the power evaluation unit operating, while a preamble of the tag signal is received.

11. The mRFID reader of claim 8, wherein the controller keeps the delay adjusting unit and the power evaluation unit operating during a $0 \sim \pi/2$ period of the tag signal.

12. The mRFID reader of claim 8, wherein the controller keeps the delay adjusting unit and the power evaluation unit operating during a $\pi$, or a $2\pi$ period of the tag signal.

13. The mRFID reader of claim 5, wherein when the power evaluation unit detects the absolute value of power continuously, the phase in the storage unit varies continuously and the delay adjusting unit provides the phase delay unit in real-time with the varying phase information such that the phase of the carrier signal varies continuously, and when the power evaluation unit detects the absolute value of power gradually, the phase in the storage unit varies gradually and the delay adjusting unit provides the phase delay unit in real-time with the varying phase information such that the phase of the carrier signal varies gradually.

* * * * *